INVENTORS
D.D. BUTTOLPH
L.C. BEARER

INVENTORS
D.D. BUTTOLPH
L.C. BEARER
BY *Young & Quigg*
ATTORNEYS

United States Patent Office 3,296,343
Patented Jan. 3, 1967

3,296,343
METHOD AND APPARATUS FOR PRODUCING BLOWN THERMOPLASTIC TUBING
Doyle D. Buttolph and Louis C. Bearer, Bartlesville, Okla., assignors to Phillips Petroleum Company, a corporation of Delaware
Filed Mar. 27, 1963, Ser. No. 268,348
5 Claims. (Cl. 264—95)

This invention relates to a method and apparatus for producing continuous, seamless blown tubing from thermoplastic materials.

It is well known in the art to form thermoplastic materials into uniform, tubular shapes by extruding the molten, thermoplastic material from a die having an annular opening. The resulting seamless, tubular shape is inflated by means of a gaseous medium usually injected through the axial portion of the die. The inflation causes an increase in the diameter of the tubing and it is cooled as it is inflated. The cooled tubing is usually collapsed between two rolls and wound upon a reel. The inflating medium is thus trapped between the rolls and the die through which the thermoplastic material is extruded. The quantity of the gaseous medium is selected so that the extruded tubing will be inflated to the diameter required to produce the predetermined, desired flat width when the tubing is flattened by the rolls and to produce the desired film thickness.

Film formed from such tubing is in large demand in the packaging field. However, problems have been encountered in developing a thin, clear film of high tensile strength, particularly in developing machines which can biaxially orient the film to increase its tensile strength.

Accordingly, an object of this invention is to provide an improved method and apparatus for producing blown tubing from thermoplastic materials, particularly high-density polymers of 1-olefins e.g., polyethylene. Another object is to provide an improved method and apparatus for producing thin, clear thermoplastic film having improved physical properties, particularly high tensile strength, increased modulus, decreased elongation, and decreased permeability to gases. These and further objects of this invention will become apparent to those skilled in the art from the following discussion, appended claims and accompanying drawing in which:

Briefly, we have discovered an improved method and apparatus for producing continuous, seamless blown tubing, wherein the blown tubing is subjected to mechanical working after it has been extruded and is partially crystallized. In the preferred embodiment of this invention, this mechanical working of the tubing is accomplished by passing the partially crystallized tubing through an annular zone formed by relative rotating bearing surfaces which apply a generally transverse compressive force on the tubing as it is pulled through said annular zone in a machine or longitudinal direction and is being transversely expanded with a gaseous inflating medium.

Figure 1:
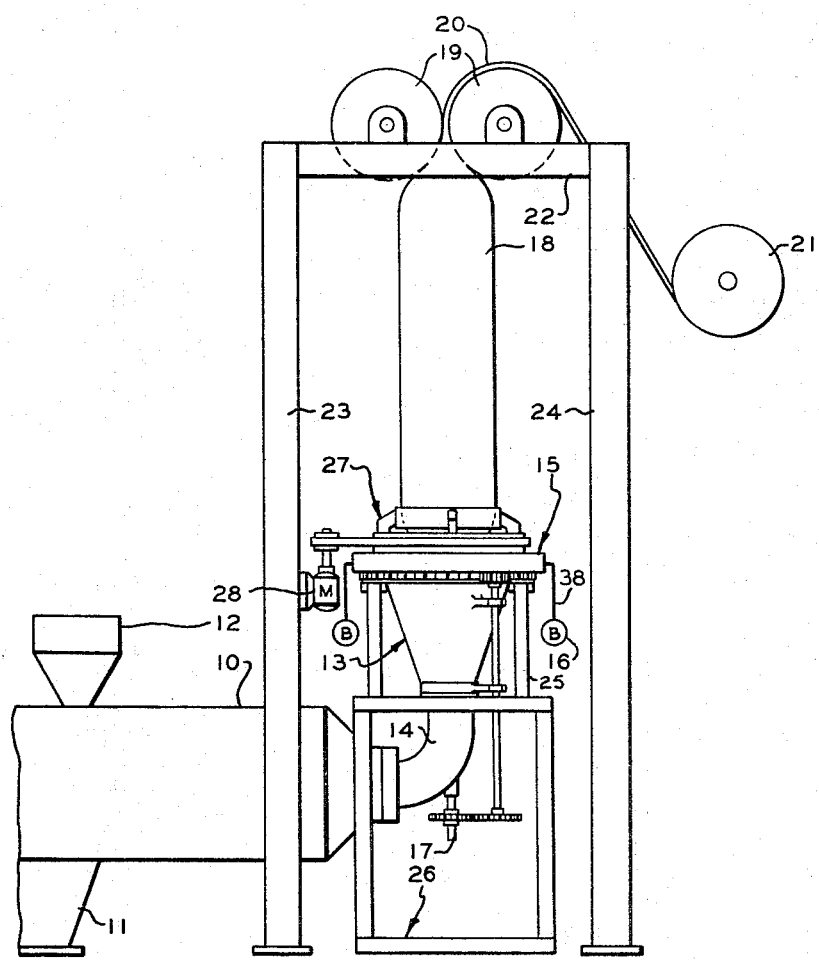
FIGURE 1 is a side elevation of an apparatus embodying the invention.

Referring now to the drawing, wherein like reference numbers have been used to designate like parts, and initially to FIGURE 1, reference number 10 designates a conventional extruder, which is supported by means 11 and fed with selected thermoplastic material from hopper 12. Extruder 10 delivers the thermoplastic material in a molten state to a die 13 via elbow 14. The molten thermoplastic material issues from the die 13 as a tubular film and it is drawn through a cooling ring 15, to which cool air or the like can be supplied by means 16 such as a blower. An inflating gas such as air is axially passed through the die 13 by means of conduit 17 and it inflates the tubular film into a "bubble" indicated at 18. The inflated tubing 18 is drawn upward by means of a pair of pinch rolls 19 or the like which collapse the tubing passing therebetween into a flattened, ribbon-like film 20 which is then wound on reel 21. Pinch rolls 19 can be mounted on cross piece 22, supported by uprights 23, 24, and cooling ring 15 can be supported by uprights 25 mounted on stand 26.

According to this invention, means are provided in combination with such apparatus for subjecting the tubular film, following its partial crystallization upon being cooled by means 15, to mechanical working. In the embodiment shown in FIGURE 1, means to effect such mechanical working are generally designated 27, the motive force necessary for the operation of such means being a motor 28 or the like which can be mounted on upright 23.

Figure 2:
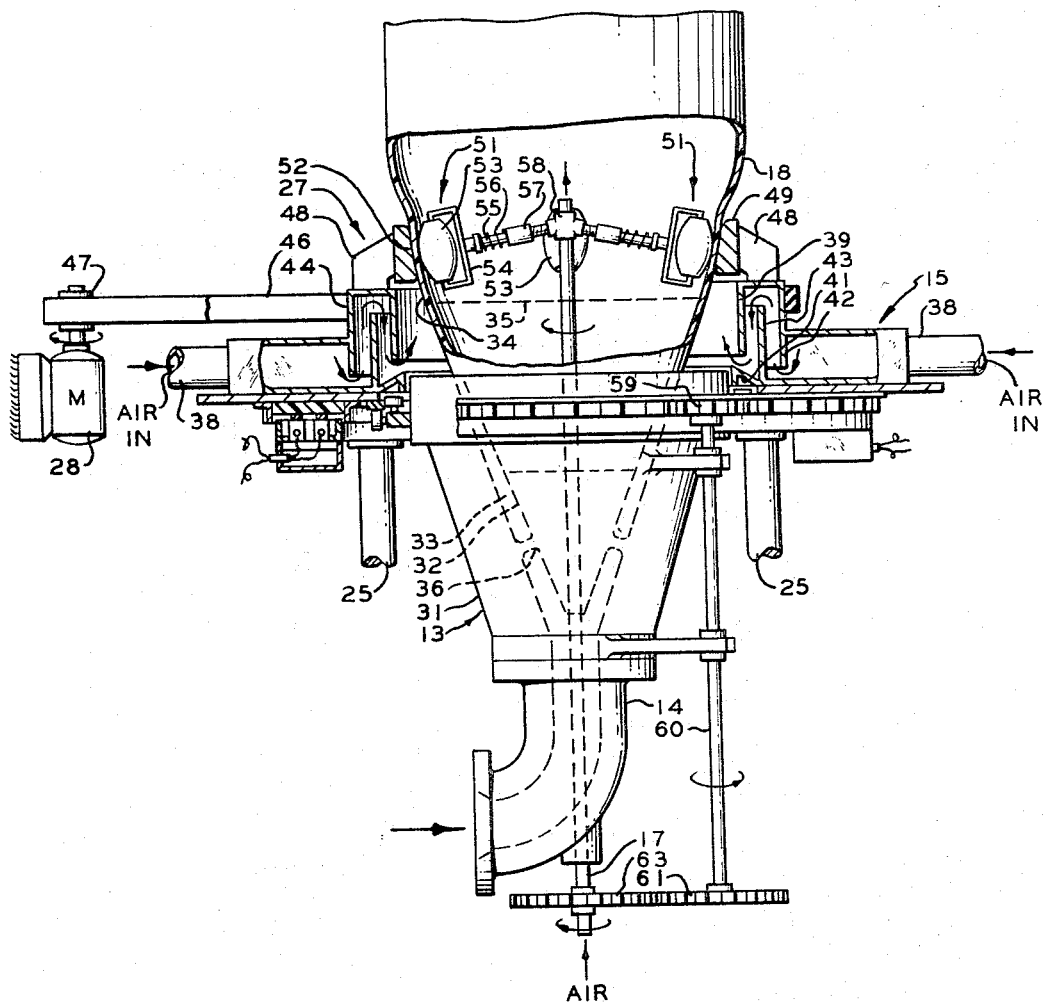
FIGURE 2 is a view in elevation and partial cross section of a portion of FIGURE 1 showing details thereof.

Referring now to the detail shown in FIGURE 2, die 13 comprises a cup 31 and an axial member or mandrel 32 disposed in space relationship to provide an annular orifice 33 from which the molten thermoplastic material, supplied from the extruder 10 by elbow 14, emerges as a hot, gum-like, viscous tubing 34. Such die can be stationary, with suitable support means such as a spider 36 supporting the mandrel 32, or can be of the type wherein the mandrel 32 is rotatable, in which case it can be affixed to rotatable shaft 17 axially passing therethrough to subject the thermoplastic material to shearing action. The thermoplastic extruded tubing 34 is cooled by an annular stream of a cooling gaseous medium, such as air, issuing from cooling ring 15. Cooling of the plastic film 34 results in the formation of a "frost line," indicated by broken line 35, at which point the film is partially cooled and is in transition from an amorphous state to a crystallized state, i.e., where crystallites are present. Although the frost line is shown as a definite boundary in the drawing, it usually is somewhat indefinite and variable depending on the nature of the plastic, cooling, etc. The mechanical working of the film, according to this invention takes place where the thermoplastic is in this transition state, usually 10–50° F. below the melting point of the thermoplastic. Cooling means which can be used to cool the film are well known in the art, for example that disclosed in U.S. Patent No. 2,632,206, issued March 24, 1953, to R. F. Pierce. Such cooling means 15 comprises an annular cylindrical housing to which the cooling medium is supplied via pipes 38. The cooling ring 15 is provided with a circular passage defined by an inner wall 39 provided with an annular slot 41 which constitutes an outlet whereby the gaseous cooling medium in the form of an annular stream is supplied to the circular passage to cool the tubing 34. The cooling ring 15 is provided with a plurality of baffles 42, 43 so that the gaseous medium will take the path shown by the arrows. Cooling ring 15 is provided with a pulley surface 44 which cooperates with a continuous belt 46 driven by pulley 47 on a shaft of motor 28. In operation, as the tubing 34 passes through the passage formed by the inner wall 39 of the cooling ring 15, its entire exterior peripheral wall surface is subjected to a continuously flowing annular converging stream of gaseous cooling medium upon rotation of the cooling ring.

Mounted on the top of the cooling ring assembly 15, by means of suitable brackets 48 or the like, is an annular shoe 49 which encircles tubing 34 at a point just above the frost line where such tubing is in transition from an amorphous to a crystallized state. Disposed within tubing 34 adjacent annular shoe 49 are a plurality of bearing means 51 which together with the shoe form an annular zone or locus through which tubing 34 passes, at which locus the tubing is subjected to compression in a transverse direction. Bearing means 51, according to the embodiment shown in FIGURE 2, each comprise a roller 53 mounted on a spindle 54 which is fastened to a radial arm 55. A spring 56 or similar biasing means can be disposed between spindle 54 and an adjustable nut 57 to adjust to the desired degree the compressive force exerted on the tubing 34. A plurality, e.g., three, of such bearing means 51, can be circumferentially spaced and attached at their inner ends to an annular bracket 58 which is fastened to the upper end of rotatable shaft 17 and rotated therewith. Rotation of shaft 17 can be accomplished by translating the rotation of cooling ring 15 to gear 59, which in turn translates it by the linkage formed by shaft 60 and gears 61, 63 to shaft 17, as shown.

In operation, shoe 49 and bearing means 51 rotate in opposite directions, as shown by the arrows, the rotation of annular shoe 49 being due to its rigid mounting on rotatable cooling ring 15. The mechanical working of the partially crystallized tubing 34, due to the transverse compressive force exerted on its peripheral portions by means of this invention, improves the physical properties of the film formed from such tubing due to orientation of the crystallites or molecules of the thermoplastic. While not intending to limit this invention to any theory of operation, it is believed that this improvement in physical properties is effected by elongation of the tubular film in a longitudinal direction, by means of the pinch rolls pulling the film in the machine direction, while at the same time elongating the film in the transverse direction, by expanding it over a gas bubble, and simultaneously compressively working the film with rollers or like means. The longitudinal and transverse stretching operations align the axis of the crystals, parallel to the molecular chain, in the plane of the film whereas the transverse compression aligns one of the other two crystal axes approximately at right angles to the plane of the film.

Figure 3:
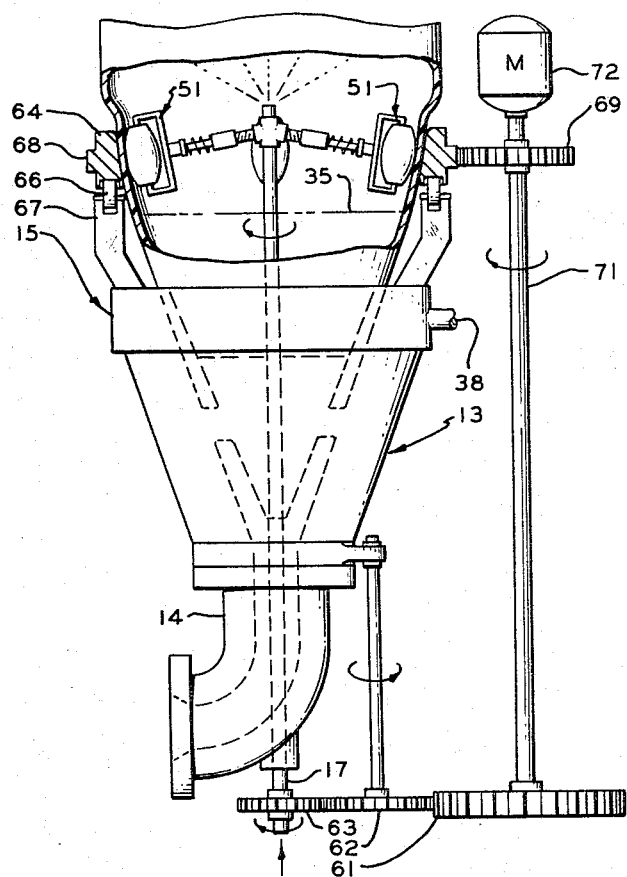
FIGURE 3 is a view like that of FIGURE 2 showing another embodiment of this invention.

In another embodiment of this invention, as shown in FIGURE 3, the annular shoe which contacts the exterior peripheral portion of the tubing, can be rotated by independent means. Referring to FIGURE 3, the annular shoe 64 rests on a plurality of rollers 66 mounted on brackets 67, and the outer wall of the shoe is provided with suitable gearing 68 which is adapted to mesh with a gear 69 mounted on shaft 71 and rotated by motor 72. In this embodiment, the cooling ring 15 can be made stationary or independently rotatable. The motive force for rotating the axial shaft 17 upon which the bearing means 51 are mounted can also be independent, or as shown in FIGURE 3, supplied by motor 68 through meshing gears 61, 62, 63.

The bearing means and annular shoe used in this invention to apply transverse compressive force to the thermoplastic film can be rotated at the same or different speeds. In any case, it is preferred to have these rotatable means rotate at sufficient speed so that the transverse compressive force that is applied on the extruded tubing is uniform, and for this purpose speeds of at least 10 r.p.m., and as high as 25 r.p.m., can be used, depending upon the diameter of the tubing and its thickness. By rotating in this manner about the same center axis of the tubing, the resulting transverse compressive force will be applied about the inner and outer peripheral surfaces of the tubing in the form of overlapping annular bands. Such contact will evenly distribute the compressive force around the peripheral portions of the extruded tubing and, together with the longitudinal stretching or pulling applied to the tubing, will result in producing film which has uniform physical properties, especially high tensile strength.

Instead of the rollers and shoe means shown in the drawing, other means can be used to apply the transverse compressive force. For example, two annular sleeves or pressure plates can be used, one inside the tubing and one outside the tubing, one or both of which can be rotated.

The subject invention is not limited in utility to the manufacture of tubing from any particular thermoplastic material. Rather, it can be employed for a variety of thermoplastic materials such as polyethylene, polypropylene, polyvinylchloride, polychlorotrifluoroethylene, nylon, polystyrene, cellulose acetate, cellulose acetate butyrate, ethyl cellulose, and copolymers of 1-olefins, such as copolymers of ethylene and butene-1, ethylene and propylene, etc. Such thermoplastic materials can be continuously extruded to form seamless tubing having varying thickness, for example between 0.003 and 0.03 inch, or sizes outside of this range.

The subject invention is particularly adapted in the manufacture of films formed from "high-density polyethylenes." This term herein signifies that the density of the polyethylene is at least 0.94 gram per cubic centimeter. Usually, the density is in the range of 0.94 to 0.98 and, often, within the range 0.95 to 0.97. The term "density" refers to the weight per unit volume (grams per cubic centimeter) of the polyethylene at 20° C. For a precise and accurate determination of density, it is desirable that the sample be at thermal and phase equilibrium. In order to insure equilibrium, it is desirable to heat the sample to a temperature 15 to 25 C. degrees above its melting point and allow the sample to cool at the rate of about 2° C. per minute to the temperature at which the density is to be measured, usually about 23° C. The method of ASTM D–1505–57T is satisfactory.

High-density polyethylenes can also be at least partially characterized in terms of their melt index. The melt index is a measure of the rate at which the polyethylene can be extruded under specific conditions. Melt index is inversely proportional to the molecular weight of the polymer. The melt index is determined according to ASTM Method D–1238–52T. For the purposes of the present invention it is preferred that the melt index be at least 0.1 and preferably from 0.2 to 10.

High-density polyethylenes are also characterized by their high crystallinities, i.e., the high percentage of the polymer which exists in the crystalline rather than the amorphous state. Crystallinity can be determined by X-ray diffraction methods or by nuclear magnetic resonance methods. Prior to the determination of crystallinity, it is desirable that the sample of polyethylene be in thermal equilibrium by treatment in the manner described in connection with the density determination. High-density polyethylenes utilized in accordance with this invention have a crystallinity of at least 80 percent, more frequently 85 to 95 percent. In many cases, especially where the polyethylene has been produced in the presence of a chromium oxide catalyst, the crystallinity is 90 percent or higher.

High-density polyethylenes are further characterized by their relatively high crystalline freezing points which are ordinarily in the range 250 to 270° F. or higher. The crystalline freezing point can be determined by allowing a sample of molten polymer to cool and plotting the temperature of the polymer versus time. That temperature at which the first plateau in the curve occurs is the crystalline freezing point.

High-density polyethylene for use in the present invention can be prepared by polymerizing ethylene at a temperature of the order of 200 to 325° F. in the presence of a catalyst, which preferably is thermally activated, comprising chromium oxide supported on silica-alumina, at least part of the chromium in the catalyst being hexavalent. Other polyethylenes can be produced by polymerizing in the presence of an organo-metallic catalyst system which can be produced, for example, by mixing an aluminum trialkyl with a titanium halide, or an aluminum alkyl halide with a titanium halide.

The polyethylene used as starting material can contain additives, such as antioxidants, preferably those which do not diminish the transparency of the resulting film.

Various modifications and alternations of this invention will become apparent to those skilled in the art from the foregoing discussion and accompanying drawing without departing from the scope and spirit of this invention, and it should be understood that this invention is not to be limited unduly to those preferred embodiments set forth herein for illustrative purposes.

We claim:

1. In the method of preparing continuous, seamless tubing of thermoplastic material, wherein such material is melted and extruded through an annular orifice in the form of tubing, cooled, inflated, and pulled in a longitudinal direction, the improvement comprising passing said tubing through an annular zone wherein rotating compressive force is applied to the peripheral portion of the tubing as it passes through said annular zone in its partially crystallized state, by applying a rotating force against the interior surface of said tubing transverse to the longitudinal direction and simultaneously applying an oppositely rotating force against the exterior surface of said tubing adjacent said rotating force so as to compress said tubing in the transverse direction, said rotating force and said oppositely rotating force having a resultant substantially zero torque on said tubing.

2. An apparatus for preparing blown plastic seamless tubing comprising means for extruding a molten thermoplastic through an annular orifice in the form of tubing, means to withdraw said tubing from said die and pull it in a longitudinal direction, means to inflate said tubing, means to cool said tubing, and means for applying transverse compressive force comprising rotatable means within said expanded tubing rotatable about the axis thereof and means comprising a rotatable bearing surface encircling said tubing rotatable about the axis thereof and disposed adjacent said rotatable means, and means to rotate said rotatable means and said bearing surface in opposite directions.

3. An apparatus for preparing blown plastic seamless tubing, comprising means for extruding a molten thermoplastic through an annular orifice in the form of tubing, means to withdraw said tubing from said die and pull it in a longitudinal direction, means to inflate said tubing, means to cool said tubing, and means for applying transverse compressive force on the peripheral portion of said tubing while it is in its partially crystallized state wherein said means for applying compressive force comprises a plurality of circumferentially spaced rotatable rollers within said tubing and disposed adjacent that portion thereof which is in its partially crystallized state, an annular rotatable shoe exterior said tubing and adjacent said rollers, and means to rotate said rollers and shoe in opposite directions.

4. Apparatus according to claim 3 wherein said means to rotate said rollers and annular shoe in opposite directions comprises a single driving means operatively connected with said rollers and said annular shoe.

5. Apparatus according to claim 3 wherein said means to rotate said rollers and annular shoe comprises a single driving motor, a shaft driven by said motor, a first gear on said shaft operatively connected with said roller and a second gear on said shaft operatively connected with said shoe.

References Cited by the Examiner

UNITED STATES PATENTS

| | | | |
|---|---|---|---|
| 2,529,897 | 11/1950 | Bailey et al. | 264—95 |
| 2,632,206 | 3/1953 | Pierce | 264—95 |
| 2,903,743 | 9/1959 | Lysobey. | |
| 3,089,187 | 5/1963 | Wolfe | 264—209 |

FOREIGN PATENTS 781,879 8/1957 Great Britain.

ROBERT F. WHITE, *Primary Examiner.*

A. R. NOE, *Assistant Examiner.*